United States Patent
Hrubec (10) Patent No.: US 11,193,557 B2
(45) Date of Patent: Dec. 7, 2021

(54) GEARBOX WITH FLEXIBLE PINS

(71) Applicant: GE Avio S.r.l., Rivalta di Torino (IT)

(72) Inventor: Juraj Hrubec, Dolny Kubin (SK)

(73) Assignee: GE AVIO S.R.L, Rivalta di Torino (IT)

( * ) Notice: Subject to any disclaimer, the term of this patent is extended or adjusted under 35 U.S.C. 154(b) by 0 days.

(21) Appl. No.: 17/028,470

(22) Filed: Sep. 22, 2020

(65) Prior Publication Data

US 2021/0102605 A1   Apr. 8, 2021

(30) Foreign Application Priority Data

Oct. 7, 2019   (IT) .................... 102019000018104

(51) Int. Cl.
*F16H 1/28* (2006.01)
*F16H 57/08* (2006.01)
*F16H 1/32* (2006.01)
*F16H 57/023* (2012.01)

(52) U.S. Cl.
CPC ......... *F16H 1/2836* (2013.01); *F16H 1/2827* (2013.01); *F16H 1/32* (2013.01); *F16H 57/023* (2013.01); *F16H 57/08* (2013.01); *F16H 57/082* (2013.01)

(58) Field of Classification Search
None
See application file for complete search history.

(56) References Cited

U.S. PATENT DOCUMENTS

| | | |
|---|---|---|
| 6,994,651 B2 | 2/2006 | Fox et al. |
| 8,246,505 B2 | 8/2012 | Saenz De Ugarte et al. |
| 8,348,803 B2 * | 1/2013 | Matsuoka ................. F16H 1/48 475/331 |
| 8,777,802 B2 | 7/2014 | Emo et al. |
| 8,961,362 B2 | 2/2015 | Fox et al. |
| 9,028,361 B2 | 5/2015 | Ordonez Vicente et al. |
| 9,702,451 B2 | 7/2017 | Gravina |
| 2010/0197444 A1 | 8/2010 | Montestruc |
| 2012/0028756 A1 * | 2/2012 | Lopez ................... F16H 57/082 475/346 |
| 2015/0285154 A1 * | 10/2015 | Sheridan ................... F16H 1/48 60/726 |

FOREIGN PATENT DOCUMENTS

| | | |
|---|---|---|
| BE | 2773871 B1 | 8/2015 |
| EP | 1674762 | 11/2010 |
| EP | 3203112 A1 | 8/2017 |
| EP | 2998615 B1 | 7/2019 |
| GB | 1101131 | 1/1968 |
| WO | 2013065024 A1 | 5/2013 |

OTHER PUBLICATIONS

Italian Search Report corresponding to Italian Application No. 102019000018104 dated Mar. 18, 2020.

* cited by examiner

*Primary Examiner* — Colby M Hansen
(74) *Attorney, Agent, or Firm* — Venable LLP; Elizabeth C. G. Gitlin; Michele V. Frank (57) ABSTRACT

An epicyclic gearbox that includes a sun gear, a ring gear, and a plurality of planet gears. The planet gears rotatably couple to the ring gear and the sun gear. Pins coupled to or formed as part of a carrier extend into the planet gears. A sleeve overhangs a notch defined, in part, by at least one of the pins. The pins, the carrier, the sleeve, or any combination of one or more of the pins, the carrier, or the sleeve are capable of flexing.

18 Claims, 10 Drawing Sheets

GEARBOX WITH FLEXIBLE PINS

The project leading to this application has received funding from the Clean Sky 2 Joint Undertaking under the European Union's Horizon 2020 research and innovation program under grant agreement No. CS2-LPA-GAM-2018/2019-01.

CROSS-REFERENCE TO RELATED APPLICATION(S)

This application claims priority to Italian Application No. 102019000018104, filed Oct. 7, 2019, which is incorporated herein by reference its entirety.

TECHNICAL FIELD

This disclosure generally relates to a gearbox, and more particularly, to a gearbox with a plurality of planet gears that include pins coupled in part to sleeves designed to flex.

BACKGROUND

Planetary gearboxes or epicyclic gearboxes typically include an outer ring gear, a central or sun gear, and a plurality of planet gears disposed between the outer ring gear and the central gear and configured to engage both the ring gear and the central gear. During operation, a drive applies a torque to at least one of the ring gear, the plurality of planet pinion gears, and the central gear, thereby inducing rotation of one or more of the other epicyclic gear assembly gears.

The planet gears can include a central aperture receiving a pinion pin, with a roller bearing assembly located between the planet pinion gear and pinion pin. The roller bearing assembly includes a plurality of circumferentially spaced roller elements or roller bearings held in a cage or circumferential races forming a raceway holding the roller bearings.

During operation, the planet gears are subjected to forces by the sun gear or the ring gear to which the planet gears are rotatably coupled. Pinion pins and roller bearing assemblies housed within the planet gears can experience deformation or uneven wear due to the forces. Additionally, or alternatively, the forces between the planet pinon gears and the sun gear or ring gear can result in deformation or uneven wear of the ring gear or sun gear. Deformation or uneven wear decreases the useful life of the gearbox and increases the time and cost of maintaining the gearbox.

BRIEF DESCRIPTION

In one aspect, the present disclosure relates to an epicyclic gearbox that includes a sun gear defining a central axis, a ring gear circumscribing the sun gear, a carrier having a middle plate located between the sun gear and the ring gear, at least one pin extending from the middle plate at a base and terminating at a tip, with a notch located between the base and the tip, a sleeve mounted on the at least one pin and having a free end overhanging the notch to define a cantilevered portion, at least one roller bearing assembly mounted to the sleeve, and a planet gear rotatably mounted to the at least one roller bearing assembly and enmeshed with the ring gear.

In another aspect, the present disclosure relates to an epicyclic gearbox that includes a sun gear defining a central axis, a ring gear circumscribing the sun gear, a carrier having a middle plate located between the sun gear and the ring gear and having opposing first and second sides defining a midplane therebetween, first and second pins, with the first pin extending from the first side and the second pin extending from the second side, with each of the first and second pins having a base and terminating at a tip, with a notch located between the base and the tip, first and second sleeves corresponding to the first and second pins, with each sleeve mounted to the corresponding pin to have a free end overhanging the notch to define a cantilevered portion, first and second roller bearing assemblies corresponding to the first and second sleeves, with each roller bearing assembly mounted to the corresponding sleeve, and first and second planet gears corresponding to the first and second roller bearing assemblies, with each of the planet gears rotatably mounted to the corresponding roller bearings assembly and enmeshed with the ring gear, wherein at least one first and second pins, first and second sleeves, first and second roller bearing assemblies, or first and second planet gears are asymmetrical relative to the midplane.

DETAILED DESCRIPTION

Aspects of the disclosure described herein are directed to an epicyclic gearbox with a sun gear, a ring gear, and a plurality of planetary gears. The plurality of planetary gears can include pins coupled to a carrier where the cross section of at least a portion of at one of the pins varies to define an undercut or notch. A sleeve can couple to the pin and overhang the notch.

By way of non-limiting example, the epicyclic gearbox can be used in conjunction with or be contained within an aircraft turbine engine. It will be understood, however, that aspects of the disclosure described herein are not so limited and may have general applicability within or coupled to an engine. It will be further understood that aspects of the disclosure described herein are not so limited and may have general applicability in non-aircraft applications.

As used herein, the terms "radial" or "radially" refer to a direction away from a common center. For example, in the overall context of an epicyclic gearbox, radial refers to a direction along a ray extending between a center longitudinal axis of the epicyclic gearbox and an outer epicyclic gearbox circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, the term "flexible" when used to describe an object means that the object is made of one or more materials that, when a force is applied, at least one portion of the object can move, bend, or contort from a first configuration to at least a second configuration without breaking and when the force is no longer applied, the object generally returns to the first configuration.

Figure 1:
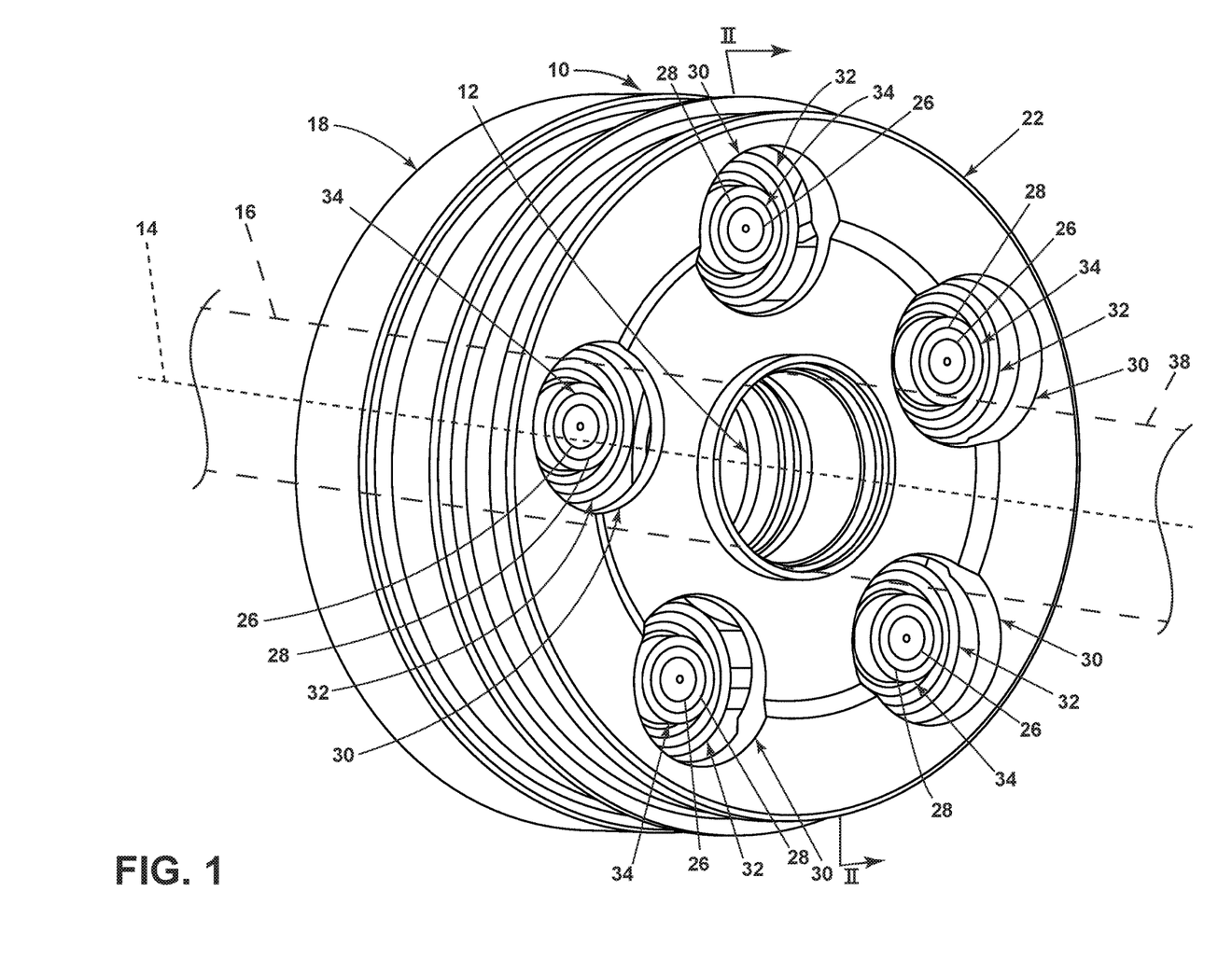
FIG. 1 is a schematic perspective diagram of an epicyclic gearbox.

FIG. 1 is a schematic illustration of a planetary gearbox or an epicyclic gearbox 10 having a sun gear shaft or sun gear 12 that defines a central axis 14 of the epicyclic gearbox 10. Optionally, a first drive shaft 16 can couple to the sun gear 12 where the sun gear 12 and the first drive shaft 16 rotate about the central axis 14. Alternatively, the sun gear 12 can be coupled to a crank or other rotatable structure.

A ring gear 18 circumscribes the sun gear 12 and defines an annular interior 20 between the ring gear 18 and the sun gear 12. A carrier 22 is located, at least in part, within the annular interior 20. At least one pin extends from the carrier 22. The at least one pin can be circumscribed by at least one sleeve. The at least one pin is illustrated by way of non-limiting example as pins 26 that are circumscribed by sleeves 28.

While illustrated as centered around the central axis 14, the carrier 22 can rotate around or be located at any position relative to the central axis 14. Openings 30 can be defined within portions of the carrier 22. It is contemplated that the carrier 22 can have any number or shape of openings through which fluid can flow or known structures can penetrate.

A plurality of planet gears 32 located within the annular interior 20 are arranged circumferentially about the sun gear 12 and couple the sun gear 12 to the ring gear 18. The planet gears 32 are illustrated, by way of non-limiting example, as five planet pinion gears. It is contemplated that the epicyclic gearbox 10 can include any number of planet gears or sets of planet gears.

The planet gears 32 can include pin apertures 34 for receiving the pins 26 or the sleeves 28, coupling the planet gears 32 to the carrier 22.

A second drive shaft 38 can couple to the carrier 22. Alternatively, the carrier 22 or the planet gears 32 can couple to a crank or other rotatable structure. Additionally, or alternatively, the ring gear 18 can couple to a drive shaft, crank, or other known rotatable structure.

It is contemplated that the number, shape, and size of the sun gear 12, the carrier 22, the ring gear 18, or each of the planet gears 32 can vary depending on the anticipated implementation. By way of non-limiting example each of the planet gears 32 can include a set of planet gears co-axially aligned to provide more load carrying capacity with while maintaining a low profile and short radial height where greater load carrying capacity is desired.

In operation, the sun gear 12 and the first drive shaft 16 rotate about the central axis 14 at relatively the same rate. The rotation of the sun gear 12 can be driven by or drive the rotation of the planet gears 32 whose relative position and contact with the sun gear 12 is maintained in a radial direction by the ring gear 18.

As the planet gears 32 rotate, the planet gears 32 revolve or travel circumferentially around the sun gear 12. The carrier 22 couples to each of the planet gears 32, rotating at a rate similar to the rate of revolution of the planet gears 32 about the sun gear 12 or central axis 14. The planet gears 32 and sun gear 12 or ring gear 18 rotatably couple to allow the planet gears 32 to rotate without slipping. It is further contemplated that any two elements of the sun gear 12, the planet gears 32, or the ring gear 18 can be permitted to rotate while the third element remains fixed. By way of non-limiting example, the planet gears 32 can be fixed. In this example, the sun gear 12 would rotates within the planet gears 32 and the ring gear 18 would rotate outside the planet gears 32. Another non-limiting example can include the sun gear 12 in a fixed position where the planet gears 32 revolve or travel circumferentially around the sun gear 12 and the ring gear 18 rotates outside the planet gears 32.

Figure 2:
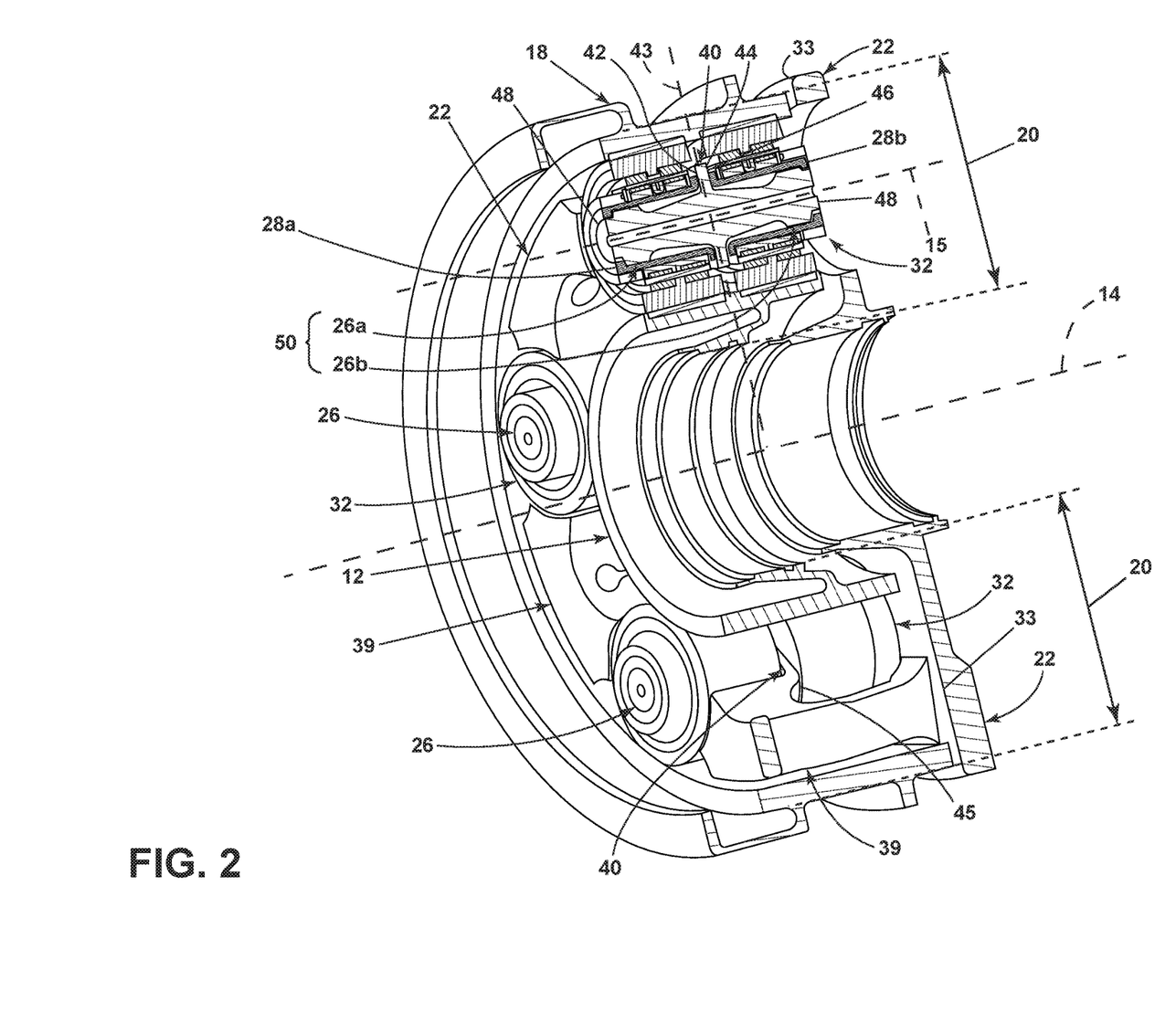
FIG. 2 is a schematic cross section view of the epicyclic gearbox of FIG. 1 along line II-II.

FIG. 2 is a schematic cross section of the epicycle gearbox 10 to further illustrate the pins 26 and the planet gears 32 contained in the annular interior 20 defined between the sun gear 12 and the ring gear 18. The carrier 22 can include a side plate 33, from which a middle plate 40 can be cantilevered. The middle plate 40 can be cantilevered from the side plate 33 by at least one pylon 39. That is, the at least one pylon 39 can cantilever the middle plate 40 to the side plate 33. The at least one pylon 39 can intersect the middle plate 40 at a junction 45. At the junction 45, the at least one pylon 39 can have a reduced cross-sectional area.

It is contemplated that the at least one pylon 39 can be, by way of non-limiting example, two pylons. The two pylons 39 can be radially spaced from each other relative to the central axis 14. The pins 26 can be located radially between the two pylons 39.

It is also contemplated that the at least one pylon 39 is non-orthogonal to both the middle plate 40 and side plate 33, where the middle plate 40 and the side plate 33 are generally parallel. That is, middle plate 40 and the side plate 33 lie in planes that intersect the central axis 14 at angles within ten degrees of each other.

The middle plate 40 can be located within the annular interior 20 and can couple to the planet gears 32 via the pins 26. That is, the pins 26 can extend from the middle plate 40 and couple the carrier 22 to the planet gears 32. The carrier 22 or the middle plate 40 can have a first portion 42 opposing a second portion 44, defining a midplane 43 therebetween. The pins 26 extend from a base 46 which can be coupled to or formed with the middle plate 40 to a respective tip 48. A first pin 26a extend from the first side 42 of the base 46 and a second pin 26b extend from the second side 44 of the base 46. The first and second pins 26a, 26b can be arranged as a mirrored pair 50 with common centerline 15. That is, the first pin 26a is located coaxially to the second pin 26b. It is contemplated that the carrier 22, the at least one pylon 39, or the middle plate 40 and the first and second pins 26a, 26b are a monolithic structure. The monolithic structure can be formed by, in non-limiting examples, 3D printing, investment casting, or stamping.

The at least one pylon 39 can extend from the carrier 22 to the middle plate 40 to the pins 26. It is contemplated that the pins 26 can be arranged as a mirrored pair 50 such that the base 46 of each of the pins 26 couples to or is formed with the middle plate 40 or the at least one pylon 39. It is further contemplated that the carrier 22, the at least one pylon 39, or the middle plate 40 can be flexible.

There is at least one sleeve 28 for each of the pins 26. A first sleeve 28a can correspond to and circumscribes the first pin 26a. Similarly, a second sleeve 28b can correspond to and circumscribes the second pin 26b.

Figure 3:
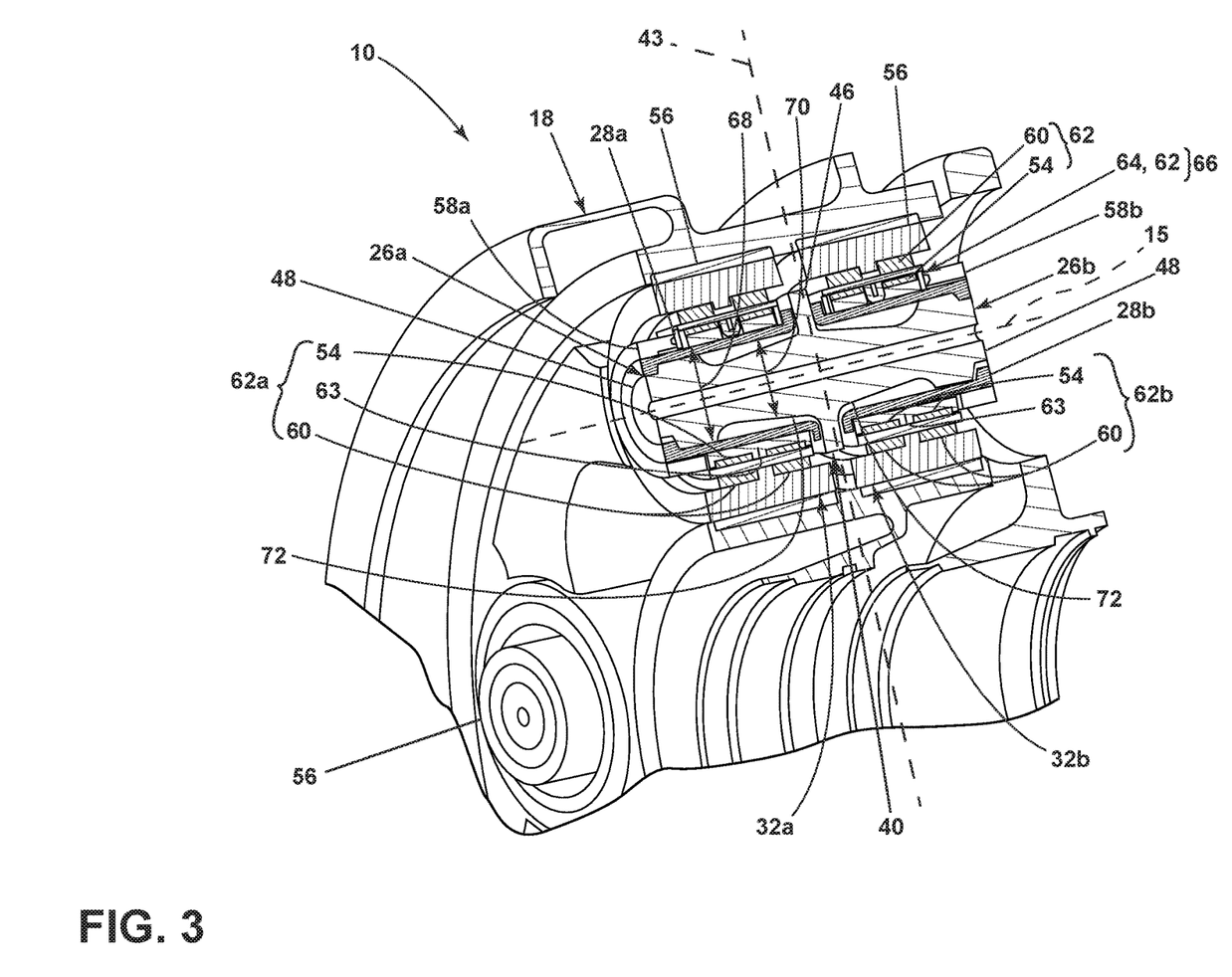
FIG. 3. is an enlarged sectional view of a portion of the epicyclic gearbox of FIG. 2 illustrating a set of planet gears.

FIG. 3 is an enlarged view of a portion of the epicyclic gearbox 10 of FIG. 2 to further illustrate a first and second planet gears 32a, 32b, including their arrangement with the carrier 22.

The first and second planet gears 32a, 32b are enmeshed with the ring gear 18. That is, the first and second planet gears 32a, 32b each have an outer surface 56 with teeth enmeshed with teeth of the ring gear 18. Each of the first and second planet gears 32a, 32b receive a corresponding pin 26 to mount the first and second planet gears 32a, 32b to the carrier 22. Thus, the first planet gear 32 has a first pin aperture 58a receiving a first pin 26a. The second planet gear 32b has a second pin aperture 58b receiving the second pin 26b.

At least one inner bearing race 54 is coupled to or supported by each of the sleeves 28. As illustrated, by way of non-limiting example, two axially adjacent inner bearing races 54 are located at or coupled to each of the first and second sleeves 28a, 28b.

At least one outer bearing race 60 is coupled to or supported by each of the first and second pin apertures 58a, 58b. As illustrated, by way of non-limiting example, each of the first and second pin apertures 58a, 58b includes two axially adjacent outer bearing races 60, however, any number of outer bearing races is contemplated.

The at least one outer bearing race 60 is arranged to correspond with the at least one inner bearing race 54 to define at least one bearing raceway 62. A plurality of roller elements or roller bearings 64 are located in the at least one bearing raceway 62. The combination of the at least one bearing raceway 62 with the roller bearings 64 forms at least one roller bearing assembly 66 for the rotation of the first and second planet gears 32a, 32b about the common centerline 15. That is, the at least one roller bearing assembly 66 can be mounted to the sleeve 28 and rotatably mounted to the planet gear 32. The at least one roller bearing assembly 66 is a non-self-centering or non-self-aligning roller bearing assembly. Additionally, or alternatively, it is contemplated that at least one roller bearing assembly 66 is self-aligning.

As illustrated, by way of non-limiting example, two adjacent inner bearing races 54 and the two adjacent outer bearing races 60 can form two axially adjacent bearing raceways 62, having a midpoint 63. A first raceway bearing set 62a is defined by at least one axially adjacent bearing raceways 62 corresponding to the first pin 26a. A second raceway bearing set 62b is defined by at least one axially adjacent bearing raceways 62 corresponding to the second pin 26b.

An undercut or notch 72 is defined by the axial portion between the base 46 and the tip 48 with the reduced cross-sectional area. For example, a first diameter 68 taken between the base 46 and the tip 48 of the first pin 26a can be used to calculate a first cross-sectional area. A second diameter 70 taken between the base 46 and the tip 48 of the first pin 26a can be used to calculate a second cross-sectional area. The decrease in the diameter from the first diameter 68 to the second diameter 70 illustrates a pin notch or notch 72 extending along an axial portion between the base 46 and the tip 48.

Figure 4:
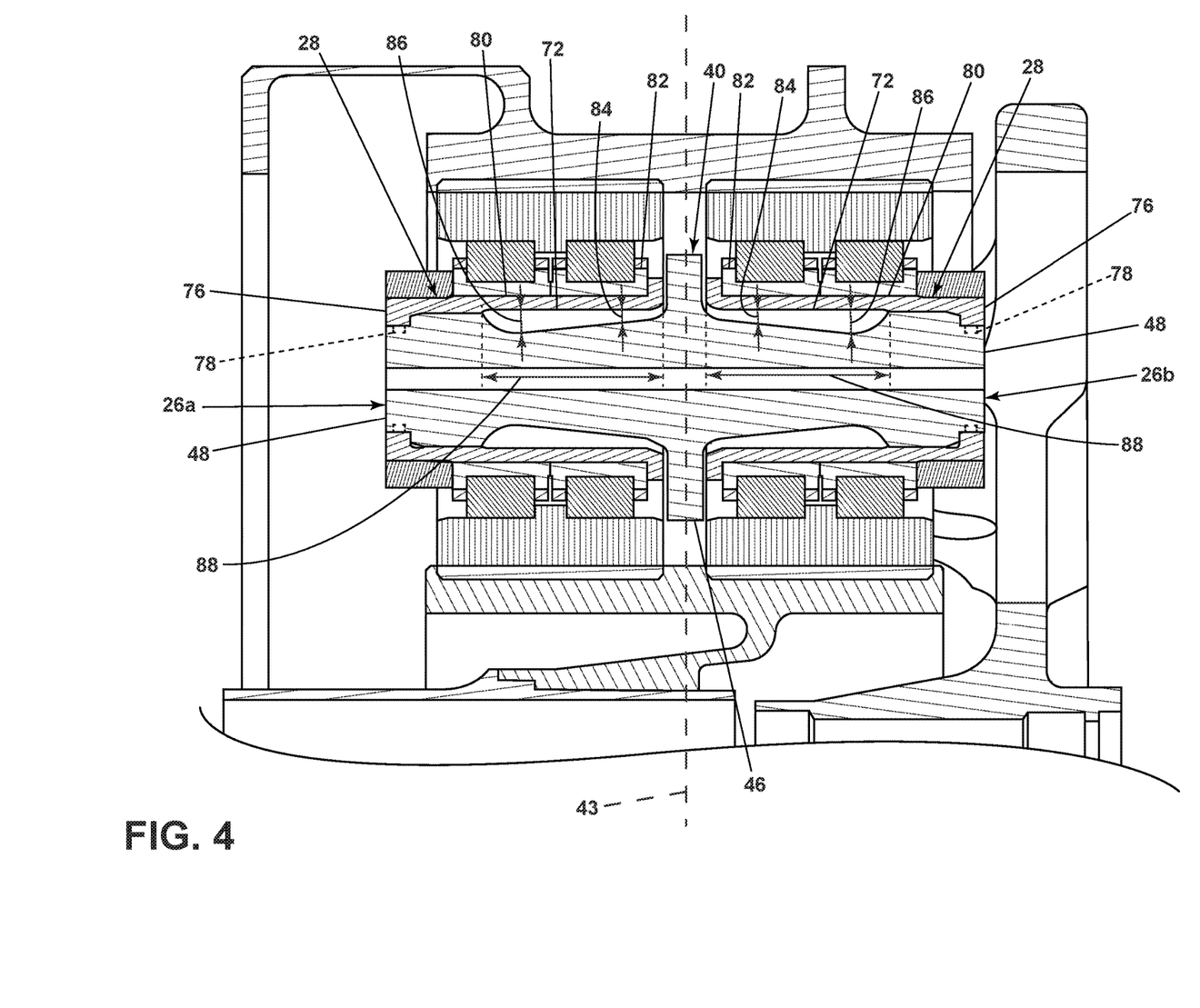
FIG. 4. is a side sectional view of the set of planet gears of FIG. 3.

FIG. 4 is a side sectional view of the schematic cross section and further illustrates the notch 72 and the sleeves 28 in relationship to the first and second pins 26a, 26b. At least some of the sleeves 28 are mounted to the tip 48 of the pins of the first or second pins 26a, 26b to define a fixed end 76. Optionally, the fixed end 76 of each of the sleeves 28 can be coupled or fixed to the tip 48 of the first or second pins 26a, 26b using a fastener 78. It is contemplated that any known method of fixing two objects such as, but not limited to, threaded fasteners, interference fit, welding, adhesives, or press fit fasteners can be used to couple the fixed end 76 of the sleeve 28 to the tip 48 of the first or second pins 26a, 26b. It is further contemplated that the sleeves 28 can couple to the first or second pins 26a, 26b at a location adjacent the tip 48. It is yet further contemplated that the fastener 78 can be or include an O-ring or seal.

The sleeve 28 has a cantilevered portion 80, which can be defined as a portion of the sleeve 28 that extends from the fixed end 76 and overhangs the notch 72, terminating in a free end 82.

The notch 72 can includes a first radial depth 84 and a second radial depth 86. As illustrated by way of non-limiting example, the first radial depth 84 is smaller than the second radial depth 86, where the smallest radial depth is nearest the carrier 22. It is contemplated that the first and second radial depths 84, 86 can be equal, resulting in a constant depth notch 72 when the pin has a constant cross-sectional area. It is further contemplated that the second radial depth 86 can be smaller than the first radial depth 84, resulting in a varying depth notch 72.

The radial depth of the notch 72 can vary along an axial length 88 of the first or second pins 26a, 26b. As illustrated by way of non-limiting example, the radial depth can continuously vary along the axial length 88. That is, the radial depth varies by increasing/decreasing in a direction from the base 46 to the tip 48. The depth of the notch can also discretely varying, such as in a stepped change in the cross-section area.

It is contemplated that the first or second pins 26a, 26b or the sleeve 28 are flexible and that the radial depth or shape of the notch can vary based on forces applied to the epicyclic gearbox 10.

While illustrated by way of non-limiting example as symmetric, it is contemplated that unequal measurements of the first radial depth 84, the second radial depth 86, or axial length 88 between the first and second pins 26a, 26b can result in asymmetry of the first and second pins 26a, 26b across the midplane 43.

Figure 5:
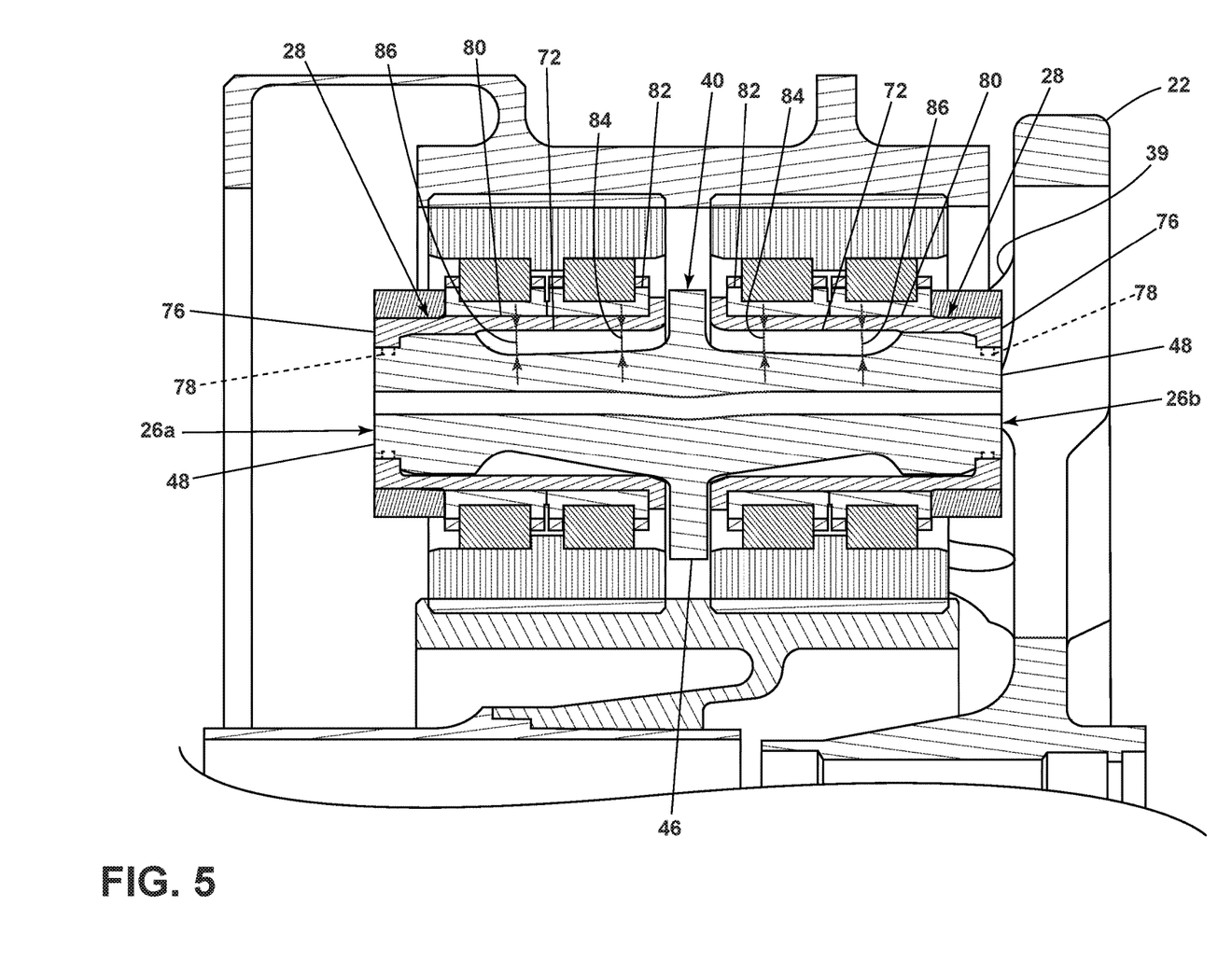
FIG. 5 is a side sectional view of the set of planet gears of FIG. 4 during operation.

FIG. 5 illustrates the first and second planet gears 32a, 32b during operation of the epicyclic gearbox 10. As the epicyclic gearbox 10 operates, forces can be applied to the planet gears 32 of the epicyclic gearbox 10. The pins 26, the carrier 22, or the sleeves 28 that circumscribe the pins 26 are allowed to flex when forces are applied. The notch 72 located between the pins 26 and the sleeves 28 allows the pins 26 or the sleeves 28 to flex in a direction that maintains the alignment of the outer and inner bearing races 54, 60. Additionally, or alternatively, the carrier 22 can flex to maintain the alignment of the outer and inner bearing races 54, 60. The carrier 22, as illustrated by way of non-limiting example, can flex at the middle plate 40 or the at least one pylon 39.

The continuous alignment of the outer and inner bearing races 54, 60 allows the bearing raceway 62 and the roller bearing 64 that make up the roller bearings assemblies 66 to remain aligned without having to change orientation or self-align. Using non-self-aligning roller bearings increases the load carrying capacity of the roller bearing assemblies 66. Additionally, or alternatively, using non-self-aligning roller bearings can provide a lighter or more compact gearbox.

By way of non-limiting example, FIG. 4 can illustrate an operating condition in which the first and second planet gears 32a, 32b of the epicycle gearbox 10 experience little to no external forces. In this example, the first radial depth 84 of the notch 72 can be smaller than the second radial depth 86. By way of further non-limiting example, FIG. 5 can illustrate an operating condition in which the first and second planet gears 32a, 32b of the epicycle gearbox 10 experience external forces. In this example, the first radial depth 84 of the notch 72 can be generally equal to the second radial depth 86, illustrating the flexing of the first and second pins 26a, 26b and the sleeves 28. It is contemplated that the operation of the epicycle gearbox 10 can result in flexing in which the difference between the first and second radial depths 84, 86 can increase or decrease.

It is contemplated that the pins 26, the carrier 22 or portions of the carrier 22, or the sleeves 28 can be made of a variety of material having different elasticity. It is also contemplated that any portion or combination of portions of the pins 26, the carrier 22, or the sleeves 28 can be manufactured to flex, where flexing can contribute to the alignment of the roller bearing assemblies 66. Additionally, or alternatively, it is further contemplated that asymmetry of the pins or the notches 72 can contribute to the alignment of the roller bearing assemblies 66.

Figure 6:
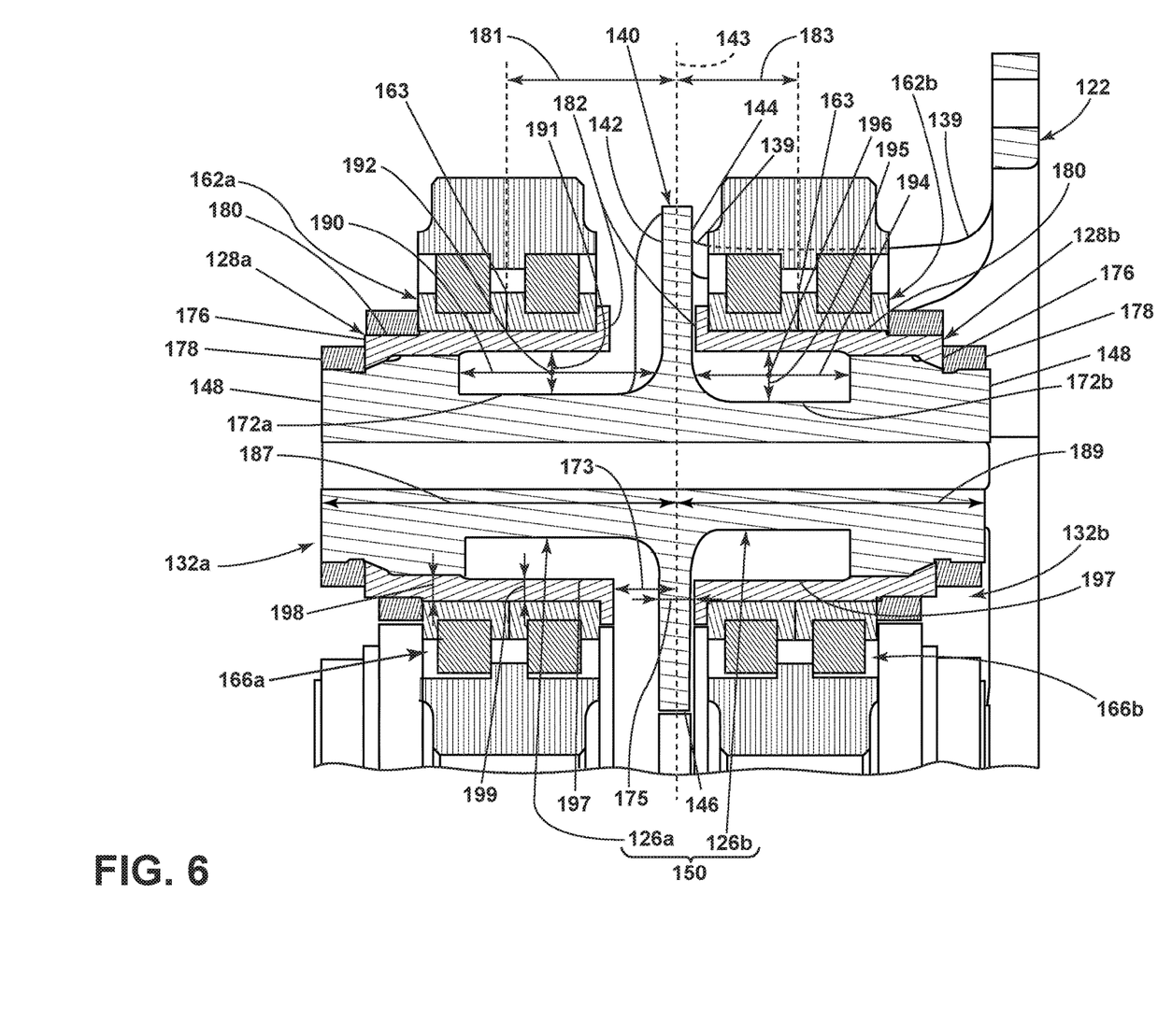
FIG. 6 is a variation of the side view of the planet gear of FIG. 4.

FIG. 6 another example of a plurality of sleeves 128 in relationship to a first and second pins 126a, 126b. The sleeves 128 and the first and second pins 126a, 126b are similar to the sleeves 28 and first and second pins 26a, 26b, therefore, like parts will be identified with like numerals increased by 100, with it being understood that the description of the like parts of the sleeves 28 and the first and second pins 26a, 26b applies to the sleeves 128 and the first and second pins 126a, 126b unless otherwise noted.

A pylon 139 couples a carrier 122 to a middle plate 140. A base 146 can be defined at least in part by the middle plate 140. The first and second pins 126a, 126b can extend the first and second portions 142, 144 of the base 146. The first and second pins 126a, 126b form a mirrored pair 150 and are asymmetrical about a midplane 143 that can be defined between the first and second portions 142, 144. A first axial length can be measured from the midplane 143 to a midpoint 163 between axially adjacent raceways 162. For example, a first pin first axial length 181 is the distance from the midplane 143 of a base 146 to the midpoint 163 of a first bearing raceway set 162a of a first roller bearing assembly 166a. A second pin first axial length 183 is the distance from the midplane 143 to the midpoint 163 of the second bearing raceway set 162b of the second roller bearing assembly 166b. As illustrated, by way of non-limiting example, the first pin first axial length 181 is greater than the second pin first axial length 183. However, it is contemplated that the axial lengths 181, 183 can be equal. It is further contemplated that the first pin first axial length 181 can be less than the second pin first axial length 183. The difference in the first axial lengths 181, 183 can result in the asymmetry between the first and second pins 126a, 126b.

A second axial length can be measured from the midplane 143 to a tip 148 of the first or second pins 126a, 126b. For example, a first pin second axial length 187 is the distance from the midplane 143 to the tip 148 of the first pin 126a. A second pin second axial length 189 is the distance from the midplane 143 to the tip 148 of the second pin 126b. As illustrated, by way of non-limiting example, the first pin second axial length 187 is greater than the second pin second axial length 189. However, it is contemplated that the second axial lengths 187, 189 can be equal. It is further contemplated that the first pin second axial length 187 can be less than the second pin second axial length 189. The difference in the second axial lengths 187, 189 can result in the asymmetry between the first and second pins 126a, 126b.

A third axial length can be measured from the midplane 143 to a free end 182 of a cantilevered portion 180 of the sleeves 128. For example, a first pin third axial length 173 is the distance from the midplane 143 to the free end 182 of a first sleeve 128a adjacent the first pin 126a. A second pin third axial length 175 is the distance from midplane 143 to the free end 182 of a second sleeve 128b adjacent the second pin 126b. As illustrated, by way of non-limiting example, the first pin third axial length 173 is greater than the second pin third axial length 175. However, it is contemplated that the third axial lengths 173, 175 can be equal. It is further contemplated that the first pin third axial length 173 can be less than the second pin third axial length 175. The difference in the third axial lengths 173, 175 can result in the asymmetry between the first and second pins 126a, 126b.

The first and second pins 126a, 126b can include different notches 172. It is contemplated that the asymmetry between the first and second pins 126a, 126b can result from different notches 172. By way of non-limiting example, the difference in the notches 172 can be a result of different notch axial lengths or different notch radial depths. A first notch 172a defined by the first pin 126a can have a first notch axial length 190 measured from the first side 142 of the carrier 122 to the junction of the first pin 126a and the sleeve 128. A first notch radial depth 191 of the first notch 172a can be taken at a first midpoint 192 of the first notch axial length 190. A second notch 172b defined by the second pin 126b can have a second notch axial length 194 measured from the second side 144 of the carrier 122 to the junction of the second pin 126b and the sleeve 128. A second notch radial depth 195 of the second notch 172b can be taken at a second midpoint 196 of the second notch axial length 194.

Asymmetry of the first and second pins 126a, 126b can result from a difference in the first, second, or third axial lengths 181, 183, 187, 189, 173, 175 or a difference in the first and second notch radial depths 191, 195. However, any dimensional difference between the first and second notches 172a, 172b is considered and can result in the asymmetry the first and second pins 126a, 126b. It is also considered that one or more of the first and second pins 126a, 126b, the first and second sleeves 128a, 128b, the first and second roller bearing assemblies 166a, 166b, or first and second planet gears 132a, 132b are asymmetrical relative to the midplane 143.

At least some of the sleeves 128 are mounted adjacent to a tip 148 of the first or second pins 126a, 126b at a fixed end 176. Optionally, the fixed end 176 of the sleeve 128 can be coupled or fixed adjacent to the tip 148 of the first or second pins 126a, 126b using a fastener 178. It is contemplated that any known method of fixing two objects such as, but not limited to, threaded fasteners, interference fit, welding, adhesives, or press fit fasteners can be used to couple the fixed end 176 of the sleeve 128 to the tip 148 of the first or second pins 126a, 126b.

The cantilevered portion 180 can be defined as a portion of the sleeve 128 that extends from the fixed end 176 and overhangs the notch 172, terminating in the free end 182. A sleeve notch 197 in the cantilevered portion 180 is defined by the axial portion between the fixed end 176 and the free end 182 that has a reduced cross-sectional area. For example, a first sleeve thickness 198 taken between the fixed end 176 and the free end 182 can be used to calculate a first cross-sectional area. A second sleeve thickness 199 taken between the fixed end 176 and the free end 182 can be used to calculate a second cross-sectional area. The decrease in the thickness from the first sleeve thickness 198 to the second sleeve thickness 199 illustrates an axial portion or sleeve notch 197 between the fixed end 176 and the free end 182 that has a reduced cross-sectional area.

It is contemplated that the first or second pins 126a, 126b or the sleeves 128 are flexible and that the radial depth or shape of the notch can vary based on forces applied to the epicyclic gearbox 10.

Figure 7:
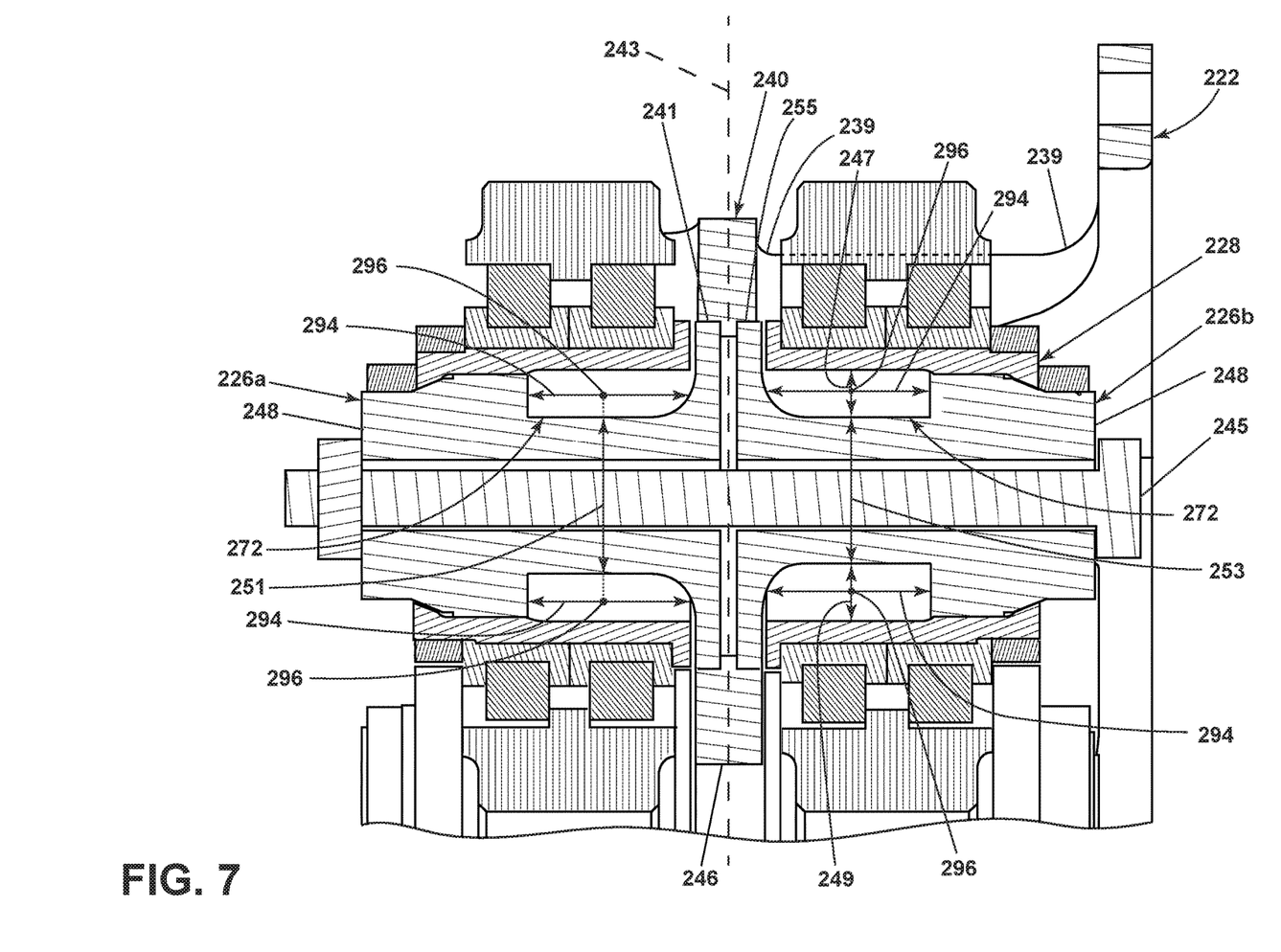
FIG. 7 is another variation of the side view of the planet gear of FIG. 4.

FIG. 7 is another example of a plurality of sleeves 228 in relationship to first and second pins 226a, 226b. The sleeves 228 and the first and second pins 226a, 226b are similar to the sleeves 28, 128 and first and second pins 26a, 26b, 126a, 126b therefore, like parts will be identified with like numerals further increased by 100, with it being understood that the description of the like parts of the sleeves 28, 128 and the first and second pins 26a, 26b, 126a, 126b applies to the sleeves 228 and the first and second pins 226a, 226b unless otherwise noted.

A carrier 222 can include at least one pylon 239. The carrier 222 or the at least one pylon 239 form or couple to a middle plate 240. The middle plate 240 can include or couple to a first plate 241 forming a first side or first portion 242 from which the first pin 226a extends and a second plate 255 forming a second side or second portion 244 from which the second pin 226b extend. A midplane 243 can be defined between the first and second portions 242, 244.

The first and second pins 226a, 226b are illustrated as two separate pieces. A fixing element 245 can establish a relative position of the first and second pins 226a, 226b. The fixing element is illustrated, by way of non-limiting example, as a bolt.

The first and second pins 226a, 226b can include different notches 272. The notch 272 can be located between a base 246 and a tip 248 of the first or second pins 226a, 226b. It is contemplated that the radial depth of the notch 272 can vary annularly. For example, a second notch 272b in the second pin 226b can have an upper radial depth 247 and a lower radial depth 249 measured at a midpoint 296 of an axial length 294. The difference in the upper and lower radial depths 247, 249 illustrates a change in the radial depth annularly. It is contemplated that the annular variation can be localized at one or more portions of the notch. It is further contemplated that the annular radial depth variation can be a result of annular variations in the sleeve 228.

Asymmetry of the first and second pins 226a, 226b can result from a difference in diameter of the first and second pins 226a, 226b. By way of non-limiting example, the diameter of the first or second pins 226a, 226b can be measured in line with the midpoint 296. The first pin 226a can have a diameter of the first pin 251 that is greater than a diameter of the second pin 253. Any diameter difference between the first and second pins 226a, 226b is considered and can result in the asymmetry the first and second pins 226a, 226b. Asymmetry of the first and second pins 226a, 226b can be observed as asymmetry across the midplane 243.

Figure 8:
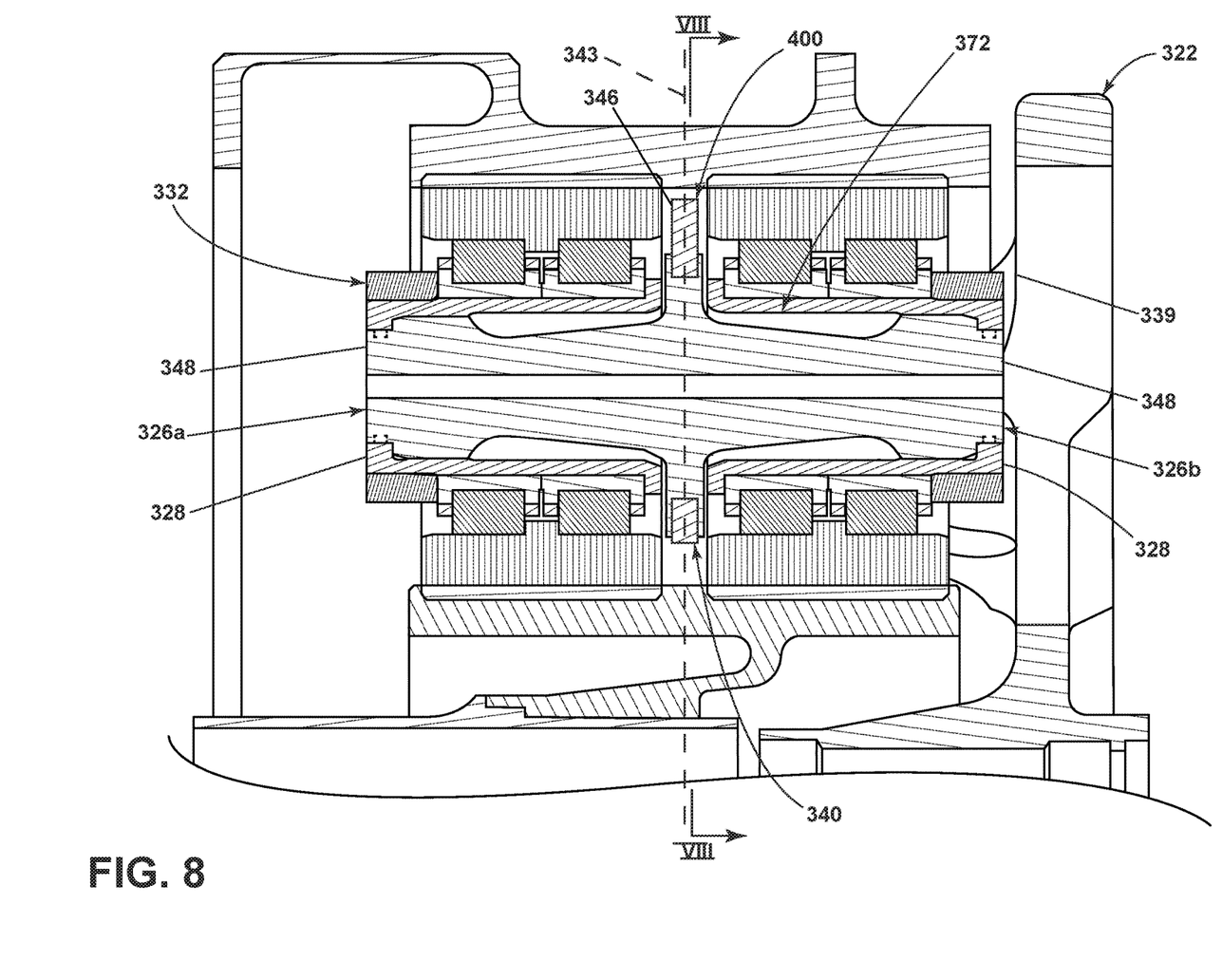
FIG. 8 yet another variation of the side view of the planet gear of FIG. 4.

FIG. 8 is yet another example of a plurality of sleeves 328 in relationship to first and second pins 326a, 326b. The sleeves 328 and the first and second pins 326a, 326b are similar to the sleeves 28, 128, 228 and first and second pins 26a, 26b, 126a, 126b, 226a, 226b therefore, like parts will be identified with like numerals further increased by 100, with it being understood that the description of the like parts of the sleeves 28, 128, 228 and the first and second pins 26a, 26b, 126a, 126b, 226a, 226b applies to the sleeves 328 and the first and second pins 326a, 326b unless otherwise noted.

The first and second pin 326a, 326b extend from a first and second side or first and second portions 342, 344 of a carrier 322 or a pylon 339. A midplane 343 can be defined between the first and second portions 342, 344. A notch 372 can be located between a base 346 and a tip 348 of the first or second pins 326a, 326b.

As illustrated, by way of non-limiting example, first and second pin 326a, 326b are not formed by a portion of the carrier 322. The carrier 322 can include a middle plate 340 that supports or couples to the first and second pin 326a, 326b. While not illustrated as such, it is contemplated that the carrier 322 or the middle plate 340 and the first and second pins 326a, 326b can form a monolithic structure. A subplate 400 supports or couples to the first and second pins 326a, 326b. It is also contemplated that subplate 400 and the first and second pins 326a, 326b can form a monolithic structure.

Figure 9:
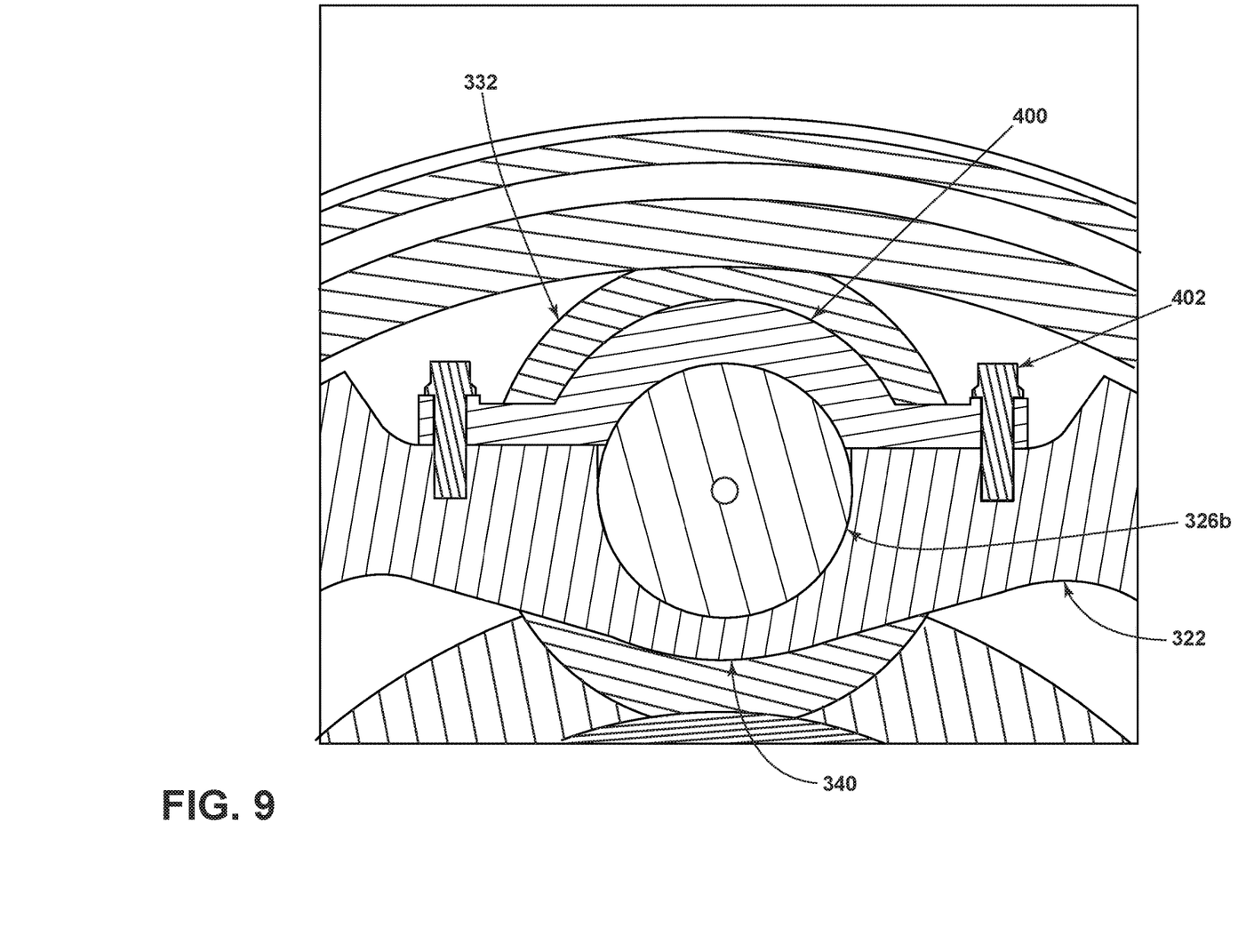
FIG. 9 is a schematic cross-sectional view of the planet gear of FIG. 8 along line IX-IX.

FIG. 9 is a schematic cross section taken along line IX-IX from FIG. 8 illustrating the middle plate 340 coupled to the subplate 400. The first and second pins 326a, 326b are circumscribed by the middle plate 340 which can be coupled to the subplate 400. The subplate 400 and the middle plate 340 secure the first and second pins 326a, 326b within a planet gear 332. A fastening element 402 can secure the subplate 400 to the middle plate 340 or carrier 322. The fastening element 402 is illustrated, by way of non-limiting example, as a bolt.

Figure 10:
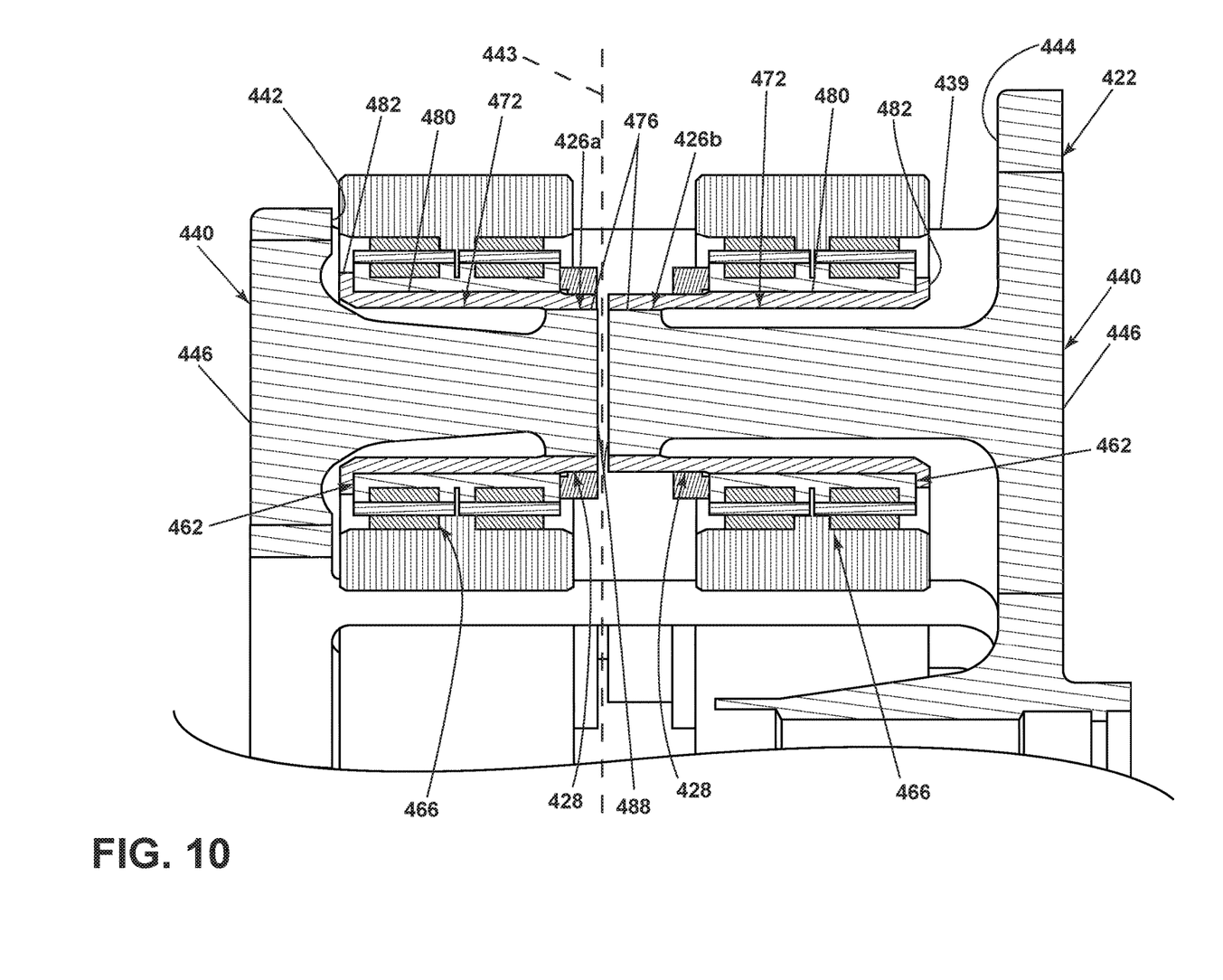
FIG. 10 is still yet another variation of the side view of the planet gear of FIG. 4.

FIG. 10 is yet another example of a plurality of sleeves 428 in relationship to a first and second pins 426a, 426b. The sleeves 428 and the first and second pins 426a, 426b are similar to the sleeves 28, 128, 228, 328 and first and second pins 26a, 26b, 126a, 126b, 226a, 226b, 326a, 326b therefore, like parts will be identified with like numerals further increased by 100, with it being understood that the description of the like parts of the sleeves 28, 128, 228, 328 and the first and second pins 26a, 26b, 126a, 126b, 226a, 226b, 326a, 326b applies to the sleeves 428 and the first and second pins 426a, 426b unless otherwise noted.

The first and second pin 426a, 426b extend from a first and second side or first and second portions 442, 444 of a carrier 422 or a pylon 439. In this configuration the first and second pins 426a, 426b are orientated so that they have confronting tips 448. At least some of the sleeves 428 are mounted to the tip 448 of the first or second pins 426a, 426b to define a fixed end 476. The sleeves 428 have a cantilevered portion 480, which can be defined as a portion of the sleeve 428 that extends from the fixed end 476 and overhangs a notch 472, terminating in a free end 482. It is contemplated that the sleeves 428 or the first and second pins 426a, 426b can flex, changing the general shape of the notch 472 to maintain alignment of raceways 462. The raceways 462 can be components of non-self-aligning roller bearing assemblies 466. One or more middle plates 440 can be formed by or coupled to the pylon 439 or the carrier 422. A midplane 443 can be defined between the first and second portions 442, 444. A midplane 443 can be defined between the first and second portions 442, 444. A notch 472 can be located between a base 446 and the tip 448 of the first or second pins 426a, 426b.

Benefits associated with aspects of the disclosure herein include the ability to use non-self-aligning roller bearings that have a higher load capacity then self-aligning roller bearing of similar dimensions. Using non-self-aligning roller bearings allows for a more compact gearbox, which can provide dimensional benefits. A more compact gearbox can also decrease the weight of the gearbox, which provides a decrease in fuel consumption.

Deflection by the pins or the carrier can dissipate at least some of the energy normally transmitted to the roller bearing assembly. The energy dissipated in the deflection of the pins or carrier allows for an even distribution of the load across the roller bearing assemblies. The deflection of the pins, the carrier, the sleeves, or any combination therein, results in the alignment of the roller bearings providing even distribution of the load.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. An epicyclic gearbox that includes a sun gear defining a central axis, a ring gear circumscribing the sun gear, a carrier having a middle plate located between the sun gear and the ring gear, at least one pin extending from the middle plate at a base and terminating at a tip, with a notch located between the base and the tip, a sleeve mounted on the at least one pin and having a free end overhanging the notch to define a cantilevered portion; at least one roller bearing assembly mounted to the sleeve, and a planet gear rotatably mounted to the at least one roller bearing assembly and enmeshed with the ring gear.

2. The epicyclic gearbox of clause 1 wherein the carrier further comprises a side plate and the middle plate is cantilevered to the side plate.

3. The epicyclic gearbox of any preceding clause wherein the carrier further comprises at least one pylon extending between the side plate and the middle plate to cantilever the middle plate to the side plate.

4. The epicyclic gearbox of any preceding clause wherein the at least one pylon comprises two pylons.

5. The epicyclic gearbox of any preceding clause wherein the two pylons are radially spaced from each other relative to the central axis and the pin is located radially between the two pylons.

6. The epicyclic gearbox of any preceding clause wherein the at least one pylon has a reduced cross-sectional area at a junction with the middle plate.

7. The epicyclic gearbox of any preceding clause wherein the middle and side plates are parallel and the at least one pylon is non-orthogonal to both the middle and side plates.

8. The epicyclic gearbox of any preceding clause where in the at least one pin comprises first and second pins, with the first pin extending from a first side of the middle plate and the second pin extending from a second side of the middle plate, opposite the first side.

9. An epicyclic gearbox that includes a sun gear defining a central axis, a ring gear circumscribing the sun gear, a carrier having a middle plate located between the sun gear and the ring gear and having opposing first and second sides defining a midplane therebetween, first and second pins, with the first pin extending from the first side and the second pin extending from the second side, with each of the first and second pins having a base and terminating at a tip, with a notch located between the base and the tip, first and second sleeves corresponding to the first and second pins, with each sleeve mounted to the corresponding pin to have a free end overhanging the notch to define a cantilevered portion, first and second roller bearing assemblies corresponding to the first and second sleeves, with each roller bearing assembly mounted to the corresponding sleeve, and first and second planet gears corresponding to the first and second roller bearing assemblies, with each of the planet gears rotatably mounted to the corresponding roller bearings assembly and enmeshed with the ring gear, wherein at least one first and second pins, first and second sleeves, first and second roller bearing assemblies, or first and second planet gears are asymmetrical with respect to each other, relative to the midplane.

10. The epicyclic gearbox of any preceding clause wherein the first and second pins have different lengths between their base and tip to form the asymmetry.

11. The epicyclic gearbox of any preceding clause wherein the first and second pins have different notches to further define the asymmetry.

12. The epicyclic gearbox of any preceding clause wherein the different notches differ by at least one of axial length or radial depth.

13. The epicyclic gearbox of any preceding clause wherein the first and second pins have differently sized notches to define the asymmetry.

14. The epicyclic gearbox of any preceding clause wherein the different notches differ by at least one of axial length or radial depth.

15. The epicyclic gearbox of any preceding clause wherein the first and second roller bearing assemblies are located at different distances relative to the midplane to define the asymmetry.

16. The epicyclic gearbox of any preceding clause wherein each of the first and second bearing assemblies comprise sets of bearing assemblies defining corresponding first and second midpoints, with the first and second midpoints located at different distances relative to the midplane to define the asymmetry.

17. The epicyclic gearbox of any preceding clause wherein the first and second sleeves are of different lengths to form the asymmetry.

18. The epicyclic gearbox of any preceding clause wherein the first and second sleeves having different length cantilevered portions to form the asymmetry.

19. The epicyclic gearbox of any preceding clause wherein the first and second planet gears are located different distances from the midplane for form the asymmetry.

20. The epicyclic gearbox of any preceding clause wherein the first and second pins have different lengths between their base and tip to further form the asymmetry.

21. The epicyclic gearbox of any preceding clause wherein the first and second pins have different notches to further define the asymmetry.

22. The epicyclic gearbox of any preceding clause wherein the first and second bearing assemblies are located at different distances relative to the midplane to define the asymmetry.

What is claimed is:

1. An epicyclic gearbox comprising:
 a sun gear defining a central axis;
 a ring gear circumscribing the sun gear;
 a carrier having:
  (a) a side plate;
  (b) a middle plate cantilevered to the side plate and located between the sun gear and the ring gear; and
  (c) at least one pylon extending between the side plate and the middle plate to cantilever the middle plate to the side plate;
 at least one pin extending from the middle plate at a base and terminating at a tip, with a notch located between the base and the tip;
 a sleeve mounted on the at least one pin and having a free end overhanging the notch to define a cantilevered portion;
 at least one roller bearing assembly mounted to the sleeve; and
 a planet gear rotatably mounted to the at least one roller bearing assembly and enmeshed with the ring gear.

2. The epicyclic gearbox of claim 1, wherein the at least one pylon comprises two pylons.

3. The epicyclic gearbox of claim 2, wherein the two pylons are radially spaced from each other relative to the central axis and the pin is located radially between the two pylons.

4. The epicyclic gearbox of claim 1, wherein the at least one pylon has a reduced cross-sectional area at a junction with the middle plate.

5. The epicyclic gearbox of claim 1, wherein the middle plate and the side plate are parallel and the at least one pylon is non-orthogonal to both the middle plate and the side plate.

6. The epicyclic gearbox of claim 1, where in the at least one pin comprises first and second pins, with the first pin extending from a first side of the middle plate and the second pin extending from a second side of the middle plate, opposite the first side.

7. An epicyclic gearbox comprising:
 a sun gear defining a central axis;
 a ring gear circumscribing the sun gear;
 a carrier having a middle plate located between the sun gear and the ring gear and having opposing first and second sides defining a midplane therebetween;
 first and second pins, with the first pin extending from the first side and the second pin extending from the second side, with each of the first and second pins having a base and terminating at a tip, with a notch located between the base and the tip;
 first and second sleeves corresponding to the first and second pins, with each sleeve mounted to the corresponding pin to have a free end overhanging the notch to define a cantilevered portion;
 first and second roller bearing assemblies corresponding to the first and second sleeves, with each roller bearing assembly mounted to the corresponding sleeve; and
 first and second planet gears corresponding to the first and second roller bearing assemblies, with each of the planet gears rotatably mounted to the corresponding roller bearings assembly and enmeshed with the ring gear;
 wherein at least one first and second pins, first and second sleeves, first and second roller bearing assemblies, or first and second planet gears are asymmetrical with respect to each other, relative to the midplane.

8. The epicyclic gearbox of claim 7, wherein the first and second pins have different lengths between their base and tip to form the asymmetry.

9. The epicyclic gearbox of claim 8, wherein the first and second pins have different notches to further define the asymmetry.

10. The epicyclic gearbox of claim 9, wherein the different notches differ by at least one of axial length or radial depth.

11. The epicyclic gearbox of claim 7, wherein the first and second pins have differently sized notches to define the asymmetry.

12. The epicyclic gearbox of claim 11, wherein the differently sized notches differ by at least one of axial length or radial depth.

13. The epicyclic gearbox of claim 7, wherein the first and second bearing assemblies are located at different distances relative to the midplane to define the asymmetry.

14. The epicyclic gearbox of claim 13, wherein each of the first and second bearing assemblies comprise sets of bearing assemblies defining corresponding first and second midpoints, with the first and second midpoints located at different distances relative to the midplane to define the asymmetry.

15. The epicyclic gearbox of claim 7, wherein the first and second sleeves are of different lengths to form the asymmetry.

16. The epicyclic gearbox of claim 7, wherein the first and second sleeves having different length cantilevered portions to form the asymmetry.

17. The epicyclic gearbox of claim 7, wherein the first and second planet gears are located different distances from the midplane for form the asymmetry.

18. The epicyclic gearbox of claim 17, wherein the first and second pins have different lengths between their base and tip to further form the asymmetry.

\* \* \* \* \*